Apr. 17, 1923.
L. P. STRUTZ
1,452,324
TIRE VALVE
Filed Jan. 6, 1922
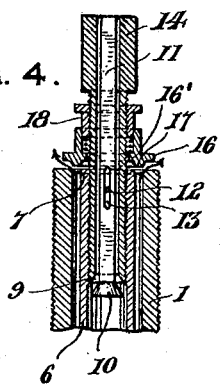
Fig. 4.
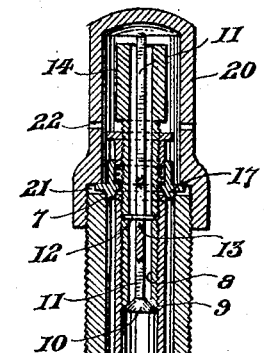
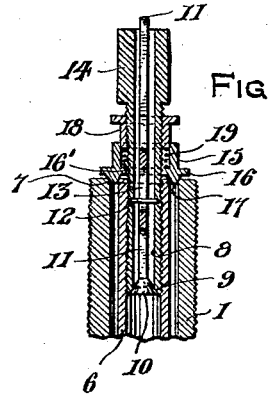
Fig. 5.
Fig. 1.
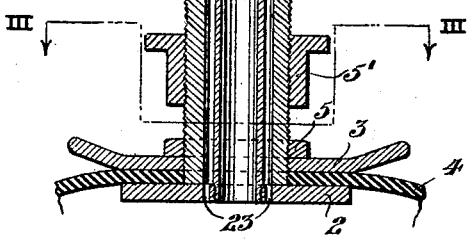
Fig. 2.
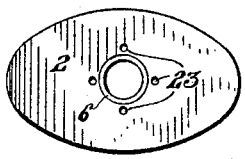
Fig. 3.
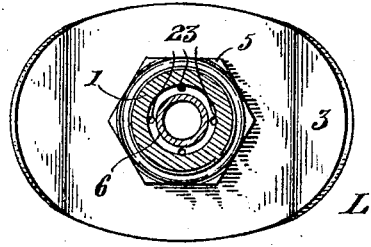
Inventor
Louis P. Strutz
By H. K. Bryant,
Attorney Patented Apr. 17, 1923.

1,452,324

UNITED STATES PATENT OFFICE.

LOUIS P. STRUTZ, OF CORNING, NEW YORK.

TIRE VALVE.

Application filed January 6, 1922. Serial No. 527,315.

*To all whom it may concern:*

Be it known that I, LOUIS P. STRUTZ, a citizen of the United States of America, residing at Corning, in the county of Steuben and State of New York, have invented certain new and useful Improvements in Tire Valves, of which the following is a specification.

This invention relates to certain new and useful improvements in tire valves and has particular reference to a tire valve having an auxiliary valve arrangement to permit the pneumatic inner tube of a tire shoe being inflated to the desired degree of pressure with the auxiliary valve functioning to exhaust excessive pressure admitted to the tube.

The primary object of the invention resides in the provision of a valve for the tubes of pneumatic tires wherein the tube or valve stem is axially disposed within and spaced from the walls of a stem casing with ports establishing communication between the interior of the tube and the space between a stem tube and casing, a regulable tension valve being associated with the outer end of the stem and casing to permit the escape of excess air pressure within the tube.

A further object of the invention has reference to the tire valve functioning in the absence of the usual closing spring, the air pressure in the tube moving the valve to its seat.

The invention further provides for a closure cap cooperating with the stem casing and auxiliary valve for retaining the auxiliary valve anchored to its seat.

With the above general objects in view and others that will appear as the nature of the invention is better understood, the same consists in the novel form, combination and arrangement of parts hereinafter more fully described in connection with the accompanying drawings and in which like characters of reference indicate similar parts throughout the views.

In the drawings,

Figure 1 is a vertical sectional view of a tire valve constructed in accordance with the present invention, showing the valve stem cap for holding the auxiliary valve anchored to its seat and the follower gland for regulating the tension on the auxiliary valve, Figure 2 is a bottom plan view of the valve stem shown in Figure 1, showing the air ports establishing communication between the interior of the tire tube and the valve stem, Figure 3 is a horizontal sectional view taken on line III—III of Figure 1 showing the air space between the stem tube and casing, Figure 4 is a fragmentary detail sectional view showing the cap removed and the auxiliary valve in an open position to permit the escape of excess air pressure in the tube with the air valve in an open position; and Figure 5 is a detail sectional view similar to Figure 4 showing the cap removed and the air valve closed by air pressure in the tube.

Referring more in detail to the accompanying drawing there is illustrated a tire valve embodying an exteriorly threaded stem casing 1 carrying a rigid oval-shaped plate 2 upon the inner end thereof with a gripping plate 3 of the usual formation threaded on the casing 1 and cooperating with the rigid plate 2 for clamping the inner tube 4 therebetween, the adjusting nut 5 retaining the parts in proper relation while the locking nut 5' threaded on the stem casing 1 extends between the rim of the tire and the stem casing.

The inflating valve includes a tube 6 of less diameter than the stem casing 1 to provide a space between the tube and casing, the tube being threaded into an opening in the plate 2, the upper end of the tube terminating substantially at the upper end of the casing 1, with the adjacent upper edges of the tube and casing constituting a valve seat 7 for the purpose to be presently described.

An externally threaded pipe section 8 has the inner end thereof threaded onto the upper internally threaded end of the tube 6, the inner end of the pipe section 8 being provided with a valve seat 9 to be engaged by the conical valve head 10 carried by the stem 11, the latter being freely disposed within the pipe section 8 and limited in its movements by the cross pin 12 extending transversely of the pipe section 8 and through the longitudinal slot 13 in the valve stem 11, the upper end of the valve stem terminating in proximity of the upper end of the pipe section 8. An enlargement 14 is formed at the upper end of the pipe section 8, providing a mounting for an air supply hose, while the air pressure in the inner tube 4 and the stem tube 6 will close the valve head 10 upon the seat 9.

An auxiliary valve is associated with the stem tube and casing and is designed for the purpose of permitting the escape of excess air pressure within the tube 4, such auxiliary valve embodying a tubular section 15 spaced therefrom as clearly illustrated, and having outwardly and inwardly laterally directed flanges 16 and 16' respectively, surrounding the pipe section 8 and a depending annular valve 17 carried by the sleeve 15 engaging the valve seat 7 at the upper end of the stem tube 6 and casing 1. To hold the valve 17 on its seat 7 and to regulate the pressure thereon, a follower gland 18 threaded on the pipe section 8 engages a coil spring 19 interposed between the follower gland and the inner flange 16' of the auxiliary valve, adjustment of the gland on the pipe section regulating the tension of the spring.

A cap 20 is threaded onto the upper end of the casing 1 to provide a closure for the upper end of the valve stem, the same being provided with an inner annular shoulder 21 adapted to engage the flange 16 of the auxiliary valve 15 for holding the valve head 17 on the seat 7. Lateral ports 22 formed in the casing cap 20 will permit the escape of air when the cap 20 is partially removed from the casing 1 and the valve 17 unseated.

In the operation of the device, to inflate the tube 4, the cap 20 of the casing 1 is removed, a tire pump or inflating hose being attached to the upper end 14 of the tube 6. Air will enter the tube 4 through the tube 6 and when the tube 4 has been inflated to the proper degree of air pressure excess air forced into the tube will escape therefrom through a series of openings or ports 23 formed in the plate 2 and into the annular space between the tube 6 and the stem casing 1, to unseat the auxiliary valve 17 and escape from the casing 1. The valve 17 is adjusted by the spring 19 to provide for the proper degree of air pressure within the tube 4 and when such degree of pressure has been reached the valve 17 will remain on its seat 7. Upon removal of the air pump from the upper end of the tube 6, the air pressure in the tube 4 will close the valve head 10 on the seat 9. To insure the seating of the auxiliary valve 17 upon its seat 7, the casing cap 20 is then applied to the casing and the shoulder 21 engages the flange 16 of the auxiliary valve to hold the latter upon its seat. Should the pressure in the tube 4 become too great, possibly occasioned by heat or otherwise, the cap 20 is partially removed from the casing 1 to permit the auxiliary valve to open and the excess air in the tube 4 to escape from the ports 22 in the cap 20. It will therefore be seen that a novel type of valve stem for pneumatic tires is provided wherein the air within the tube 4 is practically maintained at a constant pressure while the adjustment of the auxiliary valve will permit the tube to be inflated to various degrees of pressure.

While there is herein shown and described the preferred embodiment of the invention, it is nevertheless to be understood that minor changes may be made therein without departing from the spirit and scope of the invention as claimed.

What is claimed as new is:

1. A tire valve comprising a casing, a tubular member secured in the casing providing an annular air chamber with the outer ends of the casing and tubular member lying in the same plane, a valve mechanism including a pipe section threaded into the tubular member, an air valve carried by the pipe section, and a tensioned and regulable exhaust valve positioned exteriorly of the pipe section and casing and adapted to close the outer end of the air chamber between the casing and tubular member, said exhaust valve being of ring formation and embodying a depending valve body, an upstanding collar and an inwardly directed flange for engagement with a spring.

2. A tire valve comprising a casing, a tubular member secured in the casing providing an annular air chamber with the outer ends of the casing and tubular member lying in the same plane, a valve mechanism including a pipe section threaded into the tubular member, an air valve carried by the pipe section, a tensioned and regulable exhaust valve positioned exteriorly of the pipe section and casing and adapted to close the outer end of the air chamber between the casing and tubular member, said exhaust valve being of ring formation and embodying a depending valve body, an upstanding collar and an inwardly directed flange for engagement with a spring, an outwardly directed flange carried by the exhaust valve, and a shouldered cap threaded on the casing with the shoulder thereof engaging the outer flange of the valve to lock the valve on its seat.

In testimony whereof I affix my signature.

LOUIS P. STRUTZ.